United States Patent [19]

Tetsuka et al.

[11] Patent Number: 5,050,635
[45] Date of Patent: Sep. 24, 1991

[54] RELIEF VALVE

[75] Inventors: Hidetoshi Tetsuka, Saitama; Kiyoshi Hayashi, Tokyo; Tsuyoshi Ando, Tochigi, all of Japan

[73] Assignee: Tokyo Keiko Co., Ltd., Tokyo, Japan

[21] Appl. No.: 453,034

[22] Filed: Dec. 11, 1989

Related U.S. Application Data

[63] Continuation of Ser. No. 274,296, Nov. 21, 1988, abandoned.

[30] Foreign Application Priority Data

Nov. 27, 1987 [JP] Japan .................. 62-180509
Apr. 28, 1988 [JP] Japan .................. 63-104040

[51] Int. Cl.$^5$ .................................. F16K 31/38
[52] U.S. Cl. ..................... 137/489; 137/492.5
[58] Field of Search ............ 137/489, 492, 492.5; 251/33

[56] References Cited

U.S. PATENT DOCUMENTS

| | | | |
|---|---|---|---|
| 2,930,398 | 3/1960 | Barrett | 137/489 |
| 3,107,688 | 10/1963 | Caslow | 137/489 X |
| 3,373,763 | 3/1968 | Smilges | 137/489 |

FOREIGN PATENT DOCUMENTS 61-62680 3/1986 Japan .
61-62681 3/1986 Japan .
61-62682 3/1986 Japan .

Primary Examiner—Alan Cohan
Attorney, Agent, or Firm—Ladas & Parry

[57] ABSTRACT

In a relief valve of the type including a main valve unit incorporating a main valve member (poppet) adapted for engagement with a cylindrical member and a pilot valve unit for controlling a fluid pressure whereby an inlet port of the main valve unit is communicated with a control chamber of the pilot valve unit by an internal pilot passage through a choke formed in a seat member of the pilot valve unit, the choke is formed with an expanded portion having a closed end and through holes for directly communicating the expanded portion with the internal pilot passage and/or the cylindrical member is composed of a unitary-construction member formed with a plurality of flow paths communicated with one another.

6 Claims, 6 Drawing Sheets

RELIEF VALVE

This is a continuation of copending application(s) Ser. No. 07/274,296 filed on Nov. 21, 1988.

BACKGROUND OF THE INVENTION

1. Field of the Invention

The present invention relates to a relief valve including a main valve unit and a pilot valve unit.

2. Description of the Prior Art

In the past, this type of relief valve has been known in the art which includes a main valve unit 1 and a pilot valve unit 2 as shown in FIG. 8.

The main valve unit 1 includes a poppet-type main valve member 3 which is slidably fitted in a main valve chamber 1a and its poppet 3a is pressed against a valve seat 1d arranged between an inlet port 1b and an outlet port 1c by means of a spring 4.

On the other hand, the pilot valve unit 2 includes a seat member 5 fixedly mounted at one end within a pilot valve chamber 2a, and the seat member 5 includes a control chamber 5b having a valve seat 5a, a choke 5c having its one end communicated with the control chamber 5b and its other end communicated with a small-space chamber 2b and a through hole 5e communicating the control chamber 5b with an outer peripheral annular portion 5d.

In addition, disposed in the pilot valve chamber 2a is a poppet valve 7 which is pressed against the valve seat 5a by a spring 6 and the force of the spring 6 is adjusted by an adjusting screw 8 to set a pilot pressure.

Also, there are provided an internal pilot passage 9a communicating the inlet port 1b of the main valve unit 1 and the small-space chamber 2b of the pilot valve unit 2 and having a choke 9d located on the inlet port 1b side, a passage 9b communicating the main valve chamber 1a of the main valve unit 1 with the annular passage 5d of the pilot valve unit 2, and a passage 9c communicating the outlet port 1c of the main valve unit 1 with the pilot valve chamber 2a of the pilot valve unit 2.

Then, when the fluid pressure in the control chamber 5b of the pilot valve unit 2 is smaller than the force of the spring 6, the fluid pressures in the inlet port 1b, the control chamber 5 and the main valve chamber 1a of the main valve unit 1 all become equal to one another, so that the main valve member 3 is pressed against the valve seat 1d by the force of the spring 4 and a fluid pressure due to the pressure receiving area difference of the main valve member itself, thus causing no fluid flow to the outlet port 1c.

When the fluid pressure at the inlet port 1b is increased, the poppet valve 7 is moved to the right in the figure against the spring 6 and it is separated from the valve seat 5a, thereby causing a pilot flow flowing from the inlet port 1b to the outlet port 1c through the internal pilot passage 9a, the small-space chamber 2b, the choke 5c, the control chamber 5b, the pilot valve chamber 2a and the passage 9c.

As a result, a pressure difference is produced across each of the chokes 5c and 9c so that the fluid pressure in the control chamber 5b becomes lower than the fluid pressure at the inlet port 1b and fluid pressure in the control chamber 5b is directed to the main valve chamber 1a of the main valve unit 1 through the through hole 5e, the annular passage 5d and the passage 9b, thus causing a pressure difference between the fluids in the main valve chamber 1a and the inlet port 1b to separate the main valve member 3 from the valve seat 1d against the spring 4 and thereby discharge the fluid from the inlet port 1b to the outlet port 1c.

When this occurs, the fluid pressure at the inlet port 1b is decreased and the fluid pressure in the control chamber 5b is decreased. Thus, the poppet valve 7 is balanced with the force of the spring 6 and the main valve member 3 maintains the setting pressure by a certain flow rate owing to the balance among the fluid pressure at the inlet port 1b, the fluid pressure in the main valve chamber 1a and the force of the spring 4.

SUMMARY OF THE INVENTION

With the conventional relief valve of the above type, the sear member 5 formed with the valve seat 5a for the poppet valve 7 of the pilot valve 2 is formed with the long linear choke 5c which communicates the control chamber 5b and the small-space chamber 2b and the choke 5 is in turn communicated with the internal pilot passage 9a through the small-space chamber 2b and with the passage 9b through the control chamber 5b the through hole 5e and the annular passage 5d.

Of these component parts, the through hole 5e is so small that the resonant frequency of the pressure vibration is extremely high and thus virtually the resonance is prevented, thereby producing no abnormal sound.

On the other hand, due to the fact that the internal pilot passage 9a is extremely long in passage length and also large in diameter so as to prevent any delay in its operation and that the passage area for the pilot flow is varied considerably due to the throttling by the small-space chamber 2b and the choke 5c, there is a disadvantage that an abnormal sound having a fundamental frequency of several hundreds HZ is caused when the fluid pressure becomes higher than about 140 Kgf/cm$^2$.

There is another disadvantage that when such abnormal sound is caused, the pressure becomes extremely unstable and the performance of the relief valve is deteriorated.

Also, in an attempt to overcome these deficiencies, there has been disclosed a relief valve of the above type featuring a choke arranged at the control chamber side end of the internal pilot passage, a passage with a restrictor which connects the control chamber and the main valve chamber of the main valve unit, an external pilot passage connected to the main valve chamber of the main valve unit and a restrictor formed at the spring chamber side end of the external pilot passage (e.g., see Japanese Laid-Open Patent No. 61-62681).

However, the above-mentioned relief valve is disadvantageous in that the four passages are required to communicate the main valve unit and the pilot valve unit with the resulting considerable complication of the construction.

It is an object of the present invention to provide a relief valve which overcomes the foregoing deficiencies in the prior art and is capable of preventing the occurrence of any abnormal sound and ensuring the stabilization of the pressure.

To accomplish the above object, in accordance with the invention there is thus provided a relief valve of the type including a main valve unit and a pilot valve unit and communicating an inlet port of the main valve unit with a control chamber of the pilot valve unit through a choke formed in a seat member of the pilot valve unit by an internal pilot passage, wherein there are provided an expanded portion having a closed end and through holes communicating the expanded portion with the internal pilot passage at the internal pilot passage side of the choke in the seat member.

By constructing the relief valve in this way, the closed expanded portion formed at one end of the choke is directly communicated with the internal pilot passage via the through hole and thus there is the effect of eliminating the effect of the internal pilot passage which has heretofore been considered to have the greatest influence on the production of an abnormal sound in the conventional relief valve and thereby stabilizing the pressure through the prevention of the occurrence of an abnormal sound.

The present invention further proposes the provision of a cylindrical member adapted to engage with and operate in association with the main valve member.

In other words, the present invention improves on the conventional relief valve of the type which, while the construction comprises the single member, discharges the pressure fluid from the inlet port to the outlet port directly through the valve seat 1d and through the passage 1e and another conventional relief valve of the type which is constructed with the plurality of members even though it is designed for the reduction of noise through the provision of the plurality of passages.

As shown in FIG. 5 or 7, the cylindrical member (10 or 30) of this invention is complicated in the construction of fluid passages as compared with the conventional cylindrical members shown in FIGS. 8 and 1 so that the pressure fluid flows through these passages while repeating the actions of impingement and throttling, thus gradually reducing the flow velocity and thereby reducing the occurrence of noise.

On the other hand, in the case of the conventional type of comprising the plurality of passages, the member which is fixedly inserted into the valve chamber or hole of the main valve unit to receive the main valve member is formed by the plurality of members including the seat member and the sleeve force-fitted in the seat member and therefore the degree of stabilization of the pressure is greatly dependent on the accuracy of concentricity of these two members before and after their assembling.

In other words, considering such relief valve having for example a size of a flow rate of 5 to 200 L/min, it is required to operate stably over a wide pressure control range of 5 to 250 Kgf/cm². Thus, where the pressure of 250 Kgf/cm² is controlled with the pressure fluid having a flow rate or 50 L/min by a poppet-type relief valve having for example a seat opening diameter of 24 mm, the opening area between the seat opening and the main valve member is substantially 5 mm² so that the gap between the seat opening and the main valve member becomes several tens μm, whereas this gap becomes several μm in the case of the pressure fluid having a flow rate of 5 L/min.

As a result, if there exists even a slight eccentricity between the seat member and the sleeve, this makes nonuniform the gap between the forward end of the main valve member which slides over the inner peripheral surface of the sleeve and the seat opening of the seat member so that the pressure fluid acting on the outer peripheral surface of the main valve member is unbalanced and a part of the outer-peripheral surface of the main valve member is strongly pressed against a part of the sleeve inner peripheral surface, thereby causing the sliding of the main valve member to become remarkably unstable due to the frictional force produced between the two. If the degree of eccentricity is further increased, there is an inconvenience from the performance point of view that the pressure is no longer increased.

In addition, to overcome these deficiencies requires a very high degree of accuracy for the respective members and this gives rise to a disadvantage of greatly increasing the production cost. These deficiencies are overcome by the provision of a plurality of passages and by making the seat portion integral with the sleeve portion forming the sliding surface associated with the main valve member.

In other words, by thus forming the integral construction, while the pressure fluid issuing from the inlet port through the gap between the seat opening and the main valve member is discharged to the outlet port through a plurality of through holes formed on the downstream side of the seat portion, the seat opening and the sliding surface of the main valve member can be worked collectively with the resulting effect of relatively easily attaining a very high degree of concentricity, making uniform the gap between the seat opening and the main valve member, preventing the pressure from becoming unstable due to any eccentricity and making possible the production at a low cost.

DETAILED DESCRIPTION OF THE PREFERRED EMBODIMENTS

Figure 6:
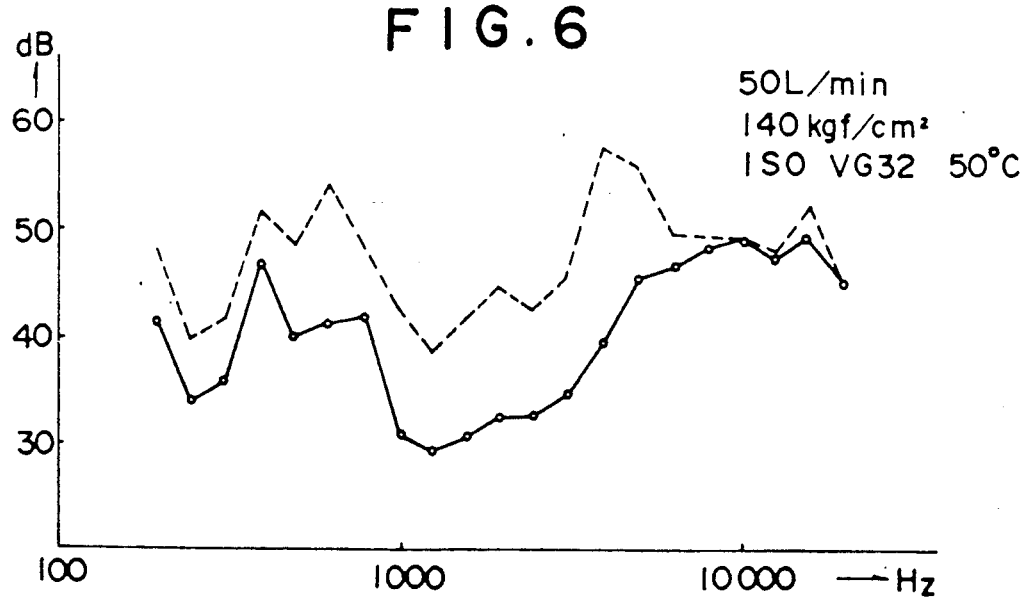
FIG. 6 is a graph showing the noise levels of the embodiment shown in FIG. 5 in comparison with those of the conventional relief valve.
Figure 7:
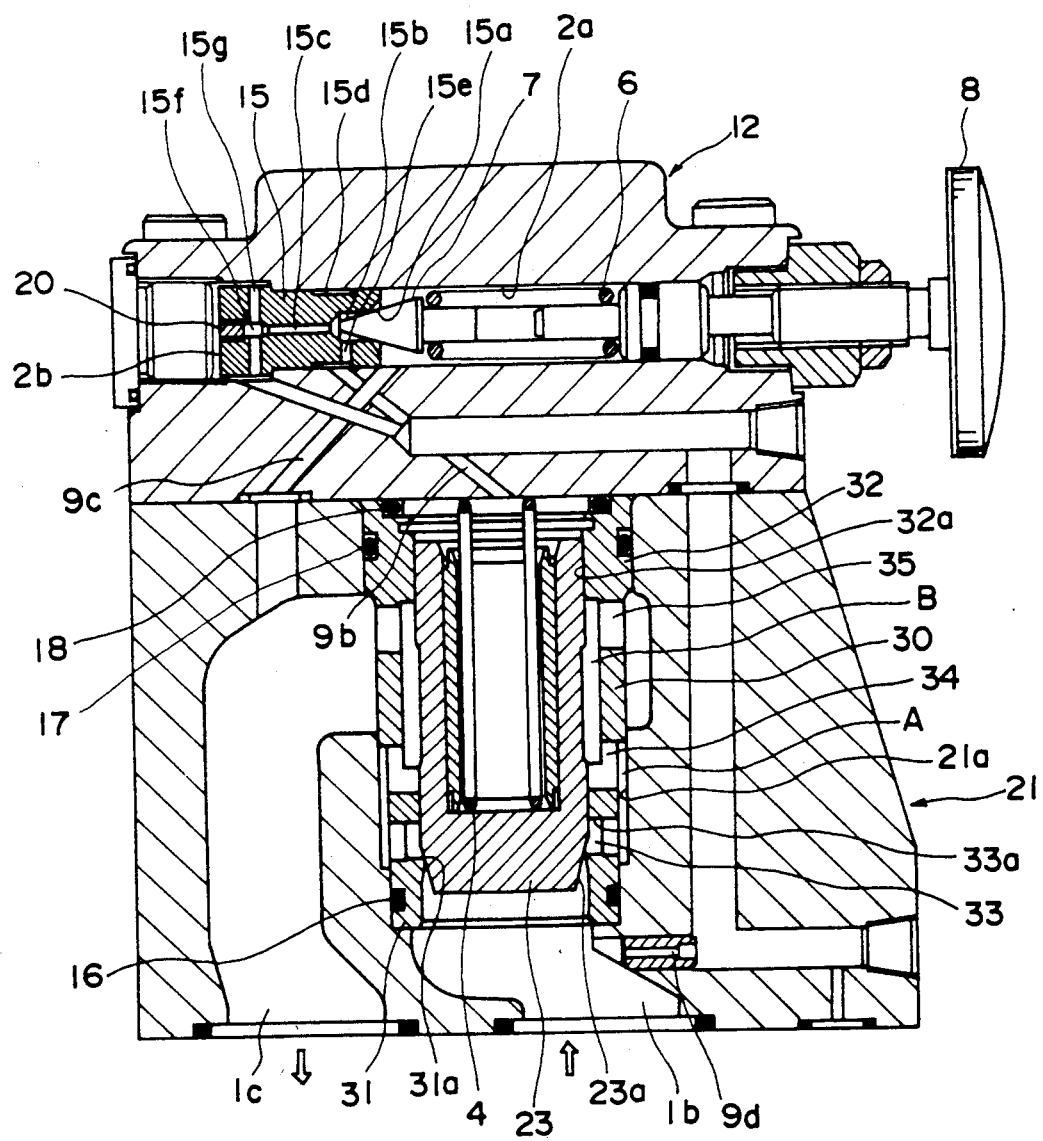
FIG. 7 is a longitudinal sectional view showing another embodiment employing the pilot valve unit and the cylindrical member according to the invention.
Figure 8:
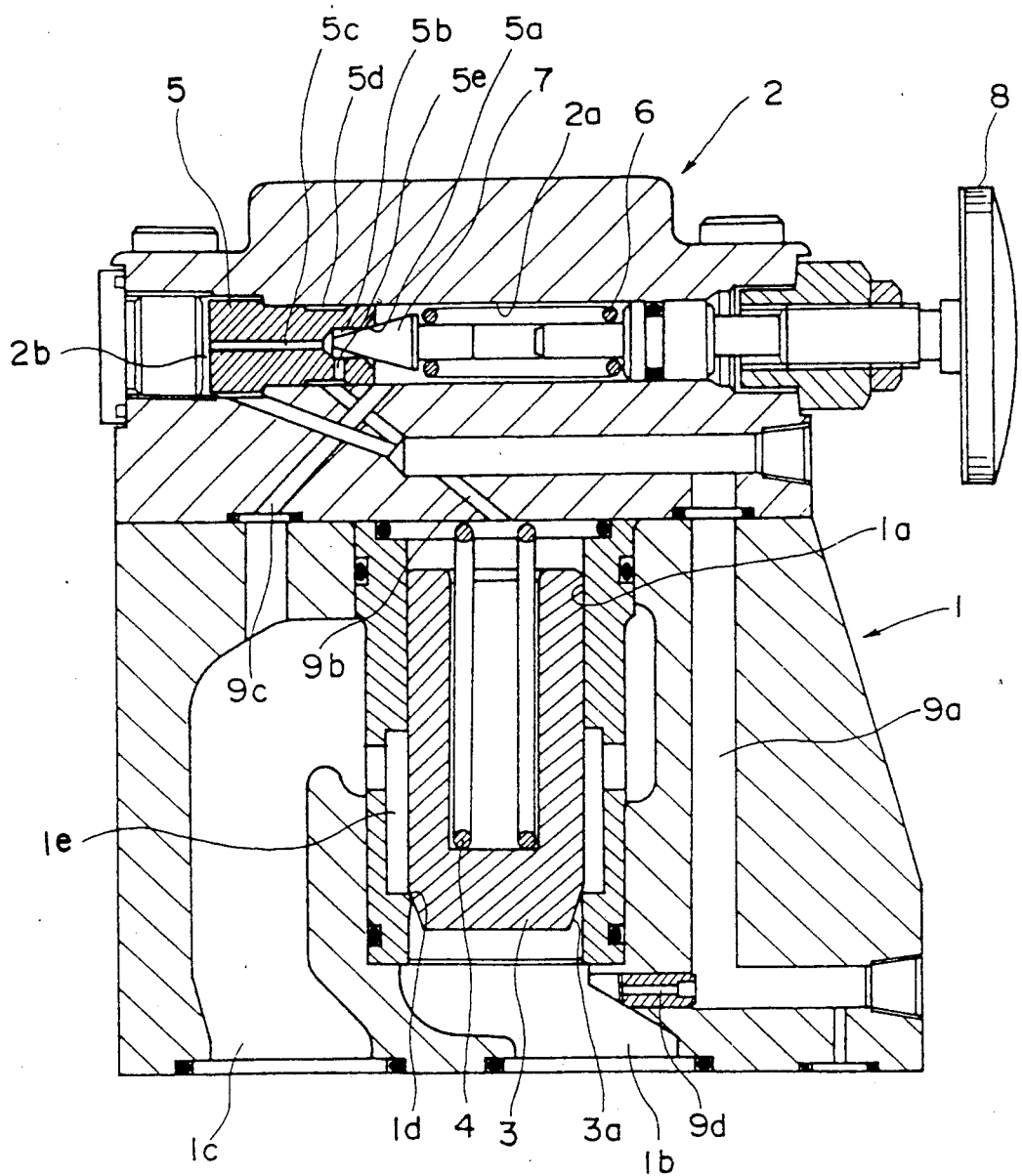
FIG. 8 is a longitudinal sectional view showing a conventional relief valve by way of example.

Now describing embodiments of the invention with reference to FIGS. 1 to 7 of the accompanying drawings, the component parts corresponding to those of FIG. 8 are designated by the same reference numerals and any description of these portions will be omitted.

Figure 1:
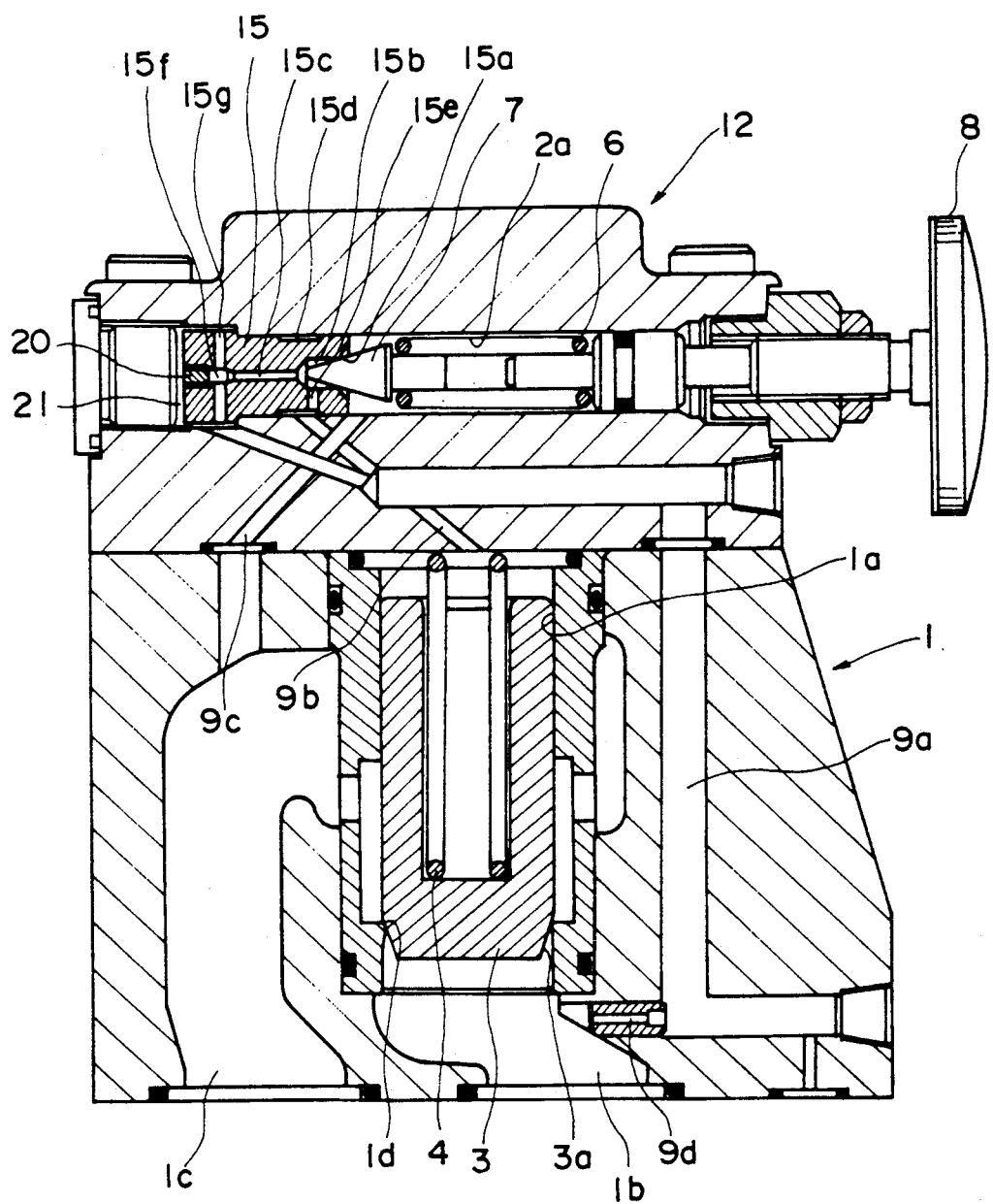
FIG. 1 is a longitudinal sectional view showing an embodiment of the present invention.
Figure 2:
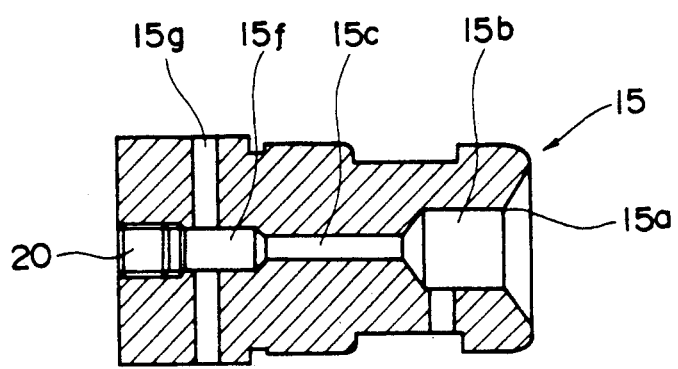
FIG. 2 is a longitudinal sectional view showing only the seat member of the pilot valve unit in the embodiment of FIG. 1.

Referring to FIGS. 1 and 2 showing an embodiment of the invention, formed in the central portion of a seat member 15 including a valve seat 15a in a pilot valve unit 12 is a choke 15c having its one end communicated with a control chamber 15b, and formed at the other end of the choke 15c is an expanded portiion 15p whose one end is closed with a setscrew 20. Also, radial through holes 15g are formed to cross the expanded portion 15f so as to directly communicate the through holes 15g with an internal pilot passage 9a.

Note that the remaining construction is the same with the counterparts of FIG. 8.

Then, where the fluid pressure in the control chamber 15b of the pilot valve unit 12 is smaller than the force of the spring 6 for pressing the poppet valve 7 against the valve seat 15a, there is not fluid flow from the inlet port 1b of the main valve unit 1 to the control chamber 15b and the fluid pressures in the inlet port 1b, the control chamber 15b and the main valve chamber 1a become equal to one another. Thus, due to the force of the spring 4 and a fluid pressure caused by the pressure receiving area difference of the main valve member itself, the poppet 3a of the main valve member 3 is pressed against the valve seat 1b and there is caused no flow of the fluid from the inlet port 1b to the outlet port 1c.

Then, when the fluid pressure in the inlet port 1b is increased so that the fluid pressure in the control chamber 15b becomes higher than the force of the spring 6, the poppet valve 7 is displaced to the right in FIG. 1 against the spring 6 and it is separated from the valve seat 15a.

When this occurs, the fluid at the inlet port 1b produces a pilot flow flowing to the outlet port 1c by passing through the internal pilot passage 9a, the through hole 15g, the choke 15c, the control chamber 15b, the pilot valve chamber 2a and the passage 9c in this order.

This pilot flow produces a pressure difference across each of the chokes 15c and 9d so that the fluid pressure in the control chamber 15b becomes lower than the fluid pressure at the inlet port 1b and the fluid pressure in the control chamber 15b is introduced into the main valve chamber 1a through the through hole 15e, the annular passage 15d and the passage 9b.

As a result, a pressure difference is produced between the main valve chamber 1a and the inlet port 1b so that when this pressure difference becomes greater than the force of the spring 4, the main valve member 3 is separated from the valve seat 1d against the spring 4 and the fluid is discharged to the outlet port 1c from the inlet port 1b.

As a result, the fluid pressure at the inlet port 1b is decreased and the fluid pressure in the control chamber 15b is decreased. Thus, the poppet valve 7 is balanced with the force of the spring 6 and the main valve member 3 maintains a setting pressure with a certain flow rate due to the balance among the fluid pressure at the inlet port 1b, the fluid pressure in the main valve chamber 1a and the force of the spring 4.

This setting pressure can be adjusted to any desired value by varying the force of the spring 6 by the adjusting screw 8 of the pilot valve unit 12.

In this embodiment, the choke 15c in the seat member 15 of the pilot valve unit 12 is directly communicated with the internal pilot passage 9a through the expanded portion 15f and the through hole 15g so that the passage length and the passage diameter are increased and the passage sectional area is varied considerably, thereby practically completely removing the effect produced on the choke 15c by the conventional internal pilot passage 9a having a tendency to cause an abnormal sound by resonance through the provision of the expanded portion 15f.

On the other hand, while the choke 15c is subject to the effects of the portions including the through hole 15e, the annular passage 15d and the passage 9b, the volume of these portions is small and the frequency of the pressure vibration is considerably higher thus preventing the occurrence of resonance with the other systems and thereby preventing the pressure from becoming unstable.

Figure 3:
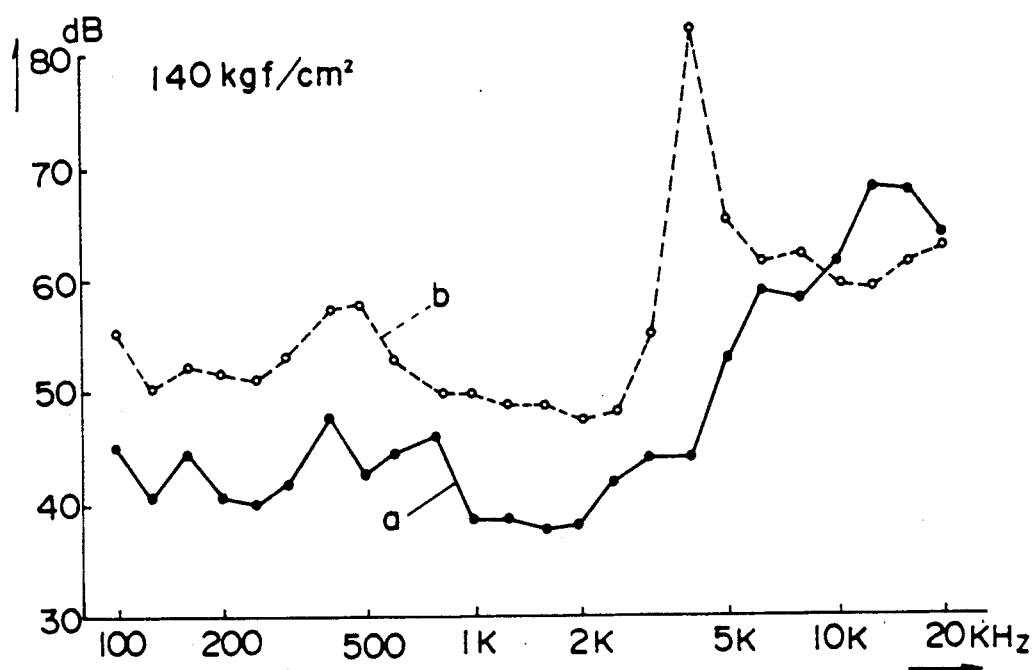
FIG. 3 is a graph showing the noise levels of the embodiment of FIG. 1 in comparison with those of a conventional relief valve.

Referring now to FIG. 3, the solid line a shows the noise levels at the respective frequencies when the pressure is around 140 kgf/cm$^2$ in the above-described embodiment and it will be seen that the noise level is considerably decreased in the range from several hundreds to several thousands Hz at which the auditory sense is sharpest in the range of human hearing as compared with the noise level of the conventional relief valve of FIG. 8 shown by the broken line b. In particular, the occurrence of such abnormal sound by resonance heretofore caused at around 4 kHz is completely prevented.

Figure 5:
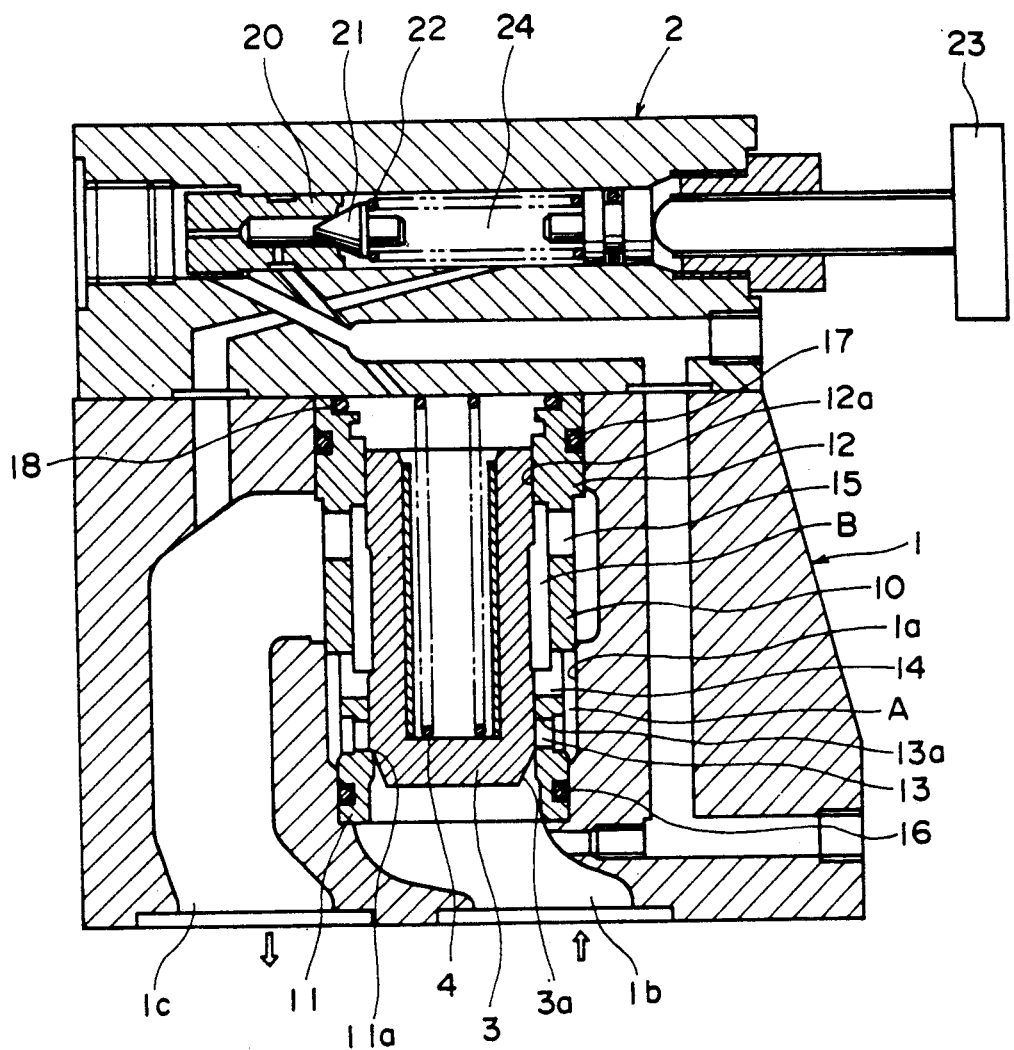
FIG. 5 is a longitudinal sectional view of a relief valve according to another embodiment of the embodiment in which only its cylindrical member is the same with the cylindrical member of FIG. 4.

Next, FIG. 5 shows another embodiment of the invention which improves only on the conventional cylindrical member, and FIG. 7 shows still another embodiment of the invention which improves on the cylindrical member over the embodiment of FIG. 1.

In the embodiment shown in FIG. 7, a main valve unit 21 includes a cylindrical member 30 which is fixedly mounted in a sealed condition in a valve hole 21a, and the cylindrical member 30 integrally includes a seat portion 31 forming a valve seat 31a which engages with a poppet 23a of a main valve member 23 and a sleeve portion 32 forming a sliding surface 32a associated with the main valve member 23, and a plurality of elongated through holes 33 are formed at substantially equal intervals along the circumferential direction to adjoin the valve seat 31a on the downstream side thereof so that the downstream-side inner surface of each through hole 33 forms an impact surface 33a for the fluid issuing through the seat gap from the inlet port 1b.

Formed downstream of the impact surfaces 33a are through holes 34 and 35 which are the same in number with each other and which are arranged in two rows at substantially equal intervals but shifted in axis direction position along the circumferential direction.

Then, there are provided an annular passage A between the outer peripheral surface of the cylindrical member 30 and the valve hole 21a to communicate the through holes 33 and 34 and an annular passage B between the inner peripheral surface of the cylindrical member 30 and the outer peripheral surface of the main valve member 23 to communicate the through holes 34 and 35, and the passage B is communicated with the out-port 1c through the through holes 35.

Note that the remaining construction is the same as the embodiment shown in FIG. 1.

In this embodiment, the jet of fluid introduced through the inlet port 1b strikes against the head of the main valve member 23 so that when the fluid pressure is increased, the main valve member 23 is forced toward the downstream side against the spring 4 and the pilot pressure in the cylindrical member 30.

When this occurs, the jet of fluid introduced through the gap between the valve seat 31a of the seat portion 31 and the poppet 23a of the main valve member 23 impinges on the impact surfaces 33a to decrease its flow velocity and the jet of fluid bounced back by the impingement is introduced into the annular passage A through the though holes 33, winds to flow into the passage B through the through holes 34, impinges on the wall surface of the valve hole 21a to further decrease its flow velocity and then winds to flow out to the outlet port 1c through the through holes 35.

In this process, while, in the case of the conventional relief valve shown in FIG. 8, the introduced pressure fluid flows through the valve seat 1d and then it is simply discharged to the outlet port 1c through the passage 1e, the flow velocity of the fluid is gradually decreased by the impingement on the impact surfaces 33a and the impingement on the wall surface of the valve hole 21a and the plurality of restrictions formed by the through holes 33, the passage A, the through holes 34, the passage B and the through holes 35 and thus the occurrence of noise sound is decreased, thereby decreasing the noise levels at the respective frequencies by more than several dB as compared with the previously mentioned embodiment. Moreover, in accordance with the invention the cylindrical member 30 is compared of a single component part so that contrary to the conventional member composed of a plurality of component parts thus tending to cause a trouble in the relief valve due to any seating failure of the main valve member 23 caused by the concentricity accuracy problem, the working accuracy of the cylindrical member relative to the main valve member 23 can be easily maintained so that not only the invention is advantageous form the cost point of view but also the valve performance is stabilized considerably.

FIG. 5 shows another embodiment of the invention which improves only on the cylindrical member of the conventional relief valve of FIG. 8 as mentioned previously. In other words, the valve body 1 is formed with the valve hole 1a and the inlet port 1b and the outlet port 1c which are communicated with the valve hole 1a.

Figure 4A:
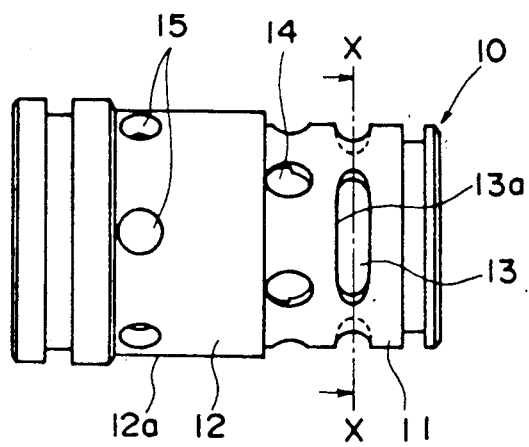
FIG. 4 shows sectional views of the cylindrical member used in another embodiment of the invention.
Figure 4B:
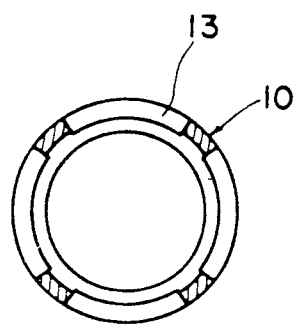

A cylindrical member 10 as shown in FIG. 4 is fixedly and sealingly fitted in the valve hole 1a through a plurality of O-rings 16, 17 and 18, and the cylindrical member 10 is integrally formed with a seat portion 11 forming a seat opening 11a adapted to engage with the poppet 3a of the main valve member 3 and a sleeve portion 12 formed with a sliding surface 12a associated with the main valve member 3, and a plurality of elongated through holes 13 are formed at substantially equal intervals with a slight spacing along the circumferential direction on the downstream side of the seat opening 11a to adjoin the seat opening 11a in such a manner that the downstream side inner surface of each through hole 13 forms an impact surface 13a for the pressure fluid issuing through the seat gap from the inlet port 1b.

Formed on the downstream side of the impact surfaces 13a are through holes 14 and 15 which are the same in number with each other and which are arranged in two rows at substantially equal intervlas but shifted in axis direction position from each other along the circumferential direction as will be seen from FIG. 4.

Also, there are provided an annular passage A between the outer peripheral surface of the cylindrical member 10 and the valve hole 1a to communicate the through holes 13 and 14 and an annular passage B between the inner peripheral surface of the cylindrical member 10 and the outer peripheral surface of the poppet 3 to communicate the through holes 14 and 15, and the through holes 15 are communicated with the outlet port 1c.

Also, the poppet 3 adapted to slide over the sliding surface 12a formed on the inner peripheral portion of the sleeve portion 12 of the cylindrical member 10, is biased in the upstream direction by the spring 4 to press its forward end poppet 3a against the seat opening 11a.

On the otherhand, a pilot valve 2 includes a pilot seat 20, a pilot poppet 21, a spring 22 for pressing the pilot poppet 21 against the pilot seat 20, etc., and the force of the spring 22 is adjusted by an adjusting screw 23 so as to serve the function of maintaining the pressure in the control chamber 5b or the annular passage 5d (FIG. 8) at the setting pressure.

With the construction described above, the operation of the embodiment will now be described.

The jet of pressure fluid introduced from the inlet port 1b impinges on the head of the main valve member 3 so that the main valve member 3 is forced toward the downstream side against the spring 4 and the pilot pressure in its spring chamber.

When this occurs, an annular gap is produced between the seat opening 11a of the seat portion 11 and the poppet 3 of the main valve member 3 so that the jet of fluid introduced through the gap impinges on the impact surface 13a thus decreasing its flow velocity and the jet of fluid bounced back as the result of the impingement flows into the annular passage A through the through holes 13, winds to flow into the annular passage B through the through holes 14, impinges against the wall surface of the valve hole 1a thus decreasing the flow velocity further and then winds to flow into the outlet port 1c through the through holes 15.

In this process, due to the two impingements on the impact surfaces 13a and the wall surface of the valve hole 1a and the plurality of restrictions formed by the through holes 13, the passage A, the through holes 14, the passage B and the through holes 15, the flow velocity of the pressure fluid is gradually decreased and the occurrence of noise is decreased considerably.

FIG. 6 shows a comparison in noice level between the embodiment of FIG. 5 (the solid line) and the conventional relief valve without any noise reducing measure (the broken line) under the conditions of flow rate 50 L/min, pressure 140 Kgf/cm$^2$ and oil temperature 50° C. (ISO VG32) and it will be seen that a satisfactory noise reducing effect is produced in the most sharp audible range of several hundreds to several thousands Hz in the human hearing range of 20 to 2000 Hz.

Also, by virtue of the provision of the seat opening 11a and the sliding surface 12a over which the main valve member 3 slides on the inner peripheral surface of the same cylindrical member 10, the gap between the seat opening 11a and the main valve member surface 3a becomes uniform all over the entire circumference so that the jet of fluid issuing through the gap applies a uniform force on the whole periphery of the main valve member 3 and thus there is no danger of a part of the outer peripheral surface of the main valve member 3 being pressed against the inner peripheral surface of the cylindrical member 10 thereby producing a nonuniform frictional force.

In accordance with the relief valve according to this embodiment, since the same cylindrical member is integrally formed with the seat portion formed with the seat opening adapted for engagement with the main valve member and the sleeve portion formed with the sliding surface over which the main valve member slides, there is the effect of making the collective working possible to prevent any eccentricity between the seat opening and the poppet face, smoothing the sliding of the main valve member with the resulting great improvement in the durability of the sliding surface and ensuring the stabilization of the pressure.

It is to be noted that while the above-described embodiment show ones applied to relief valves designed for noise reducing purposes, the invention is not intended to be limited thereto and the invention can be equally applied to any other hydraulic control valve such as a throttle valve.

What is claimed is:

1. A relief valve comprising:
   a main valve unit incorporating a main valve member adapted for engagement with a cylindrical member; and
   a pilot valve unit for controlling a pressure of a fluid;
   said cylindrical member is formed integrally with a seat portion formed with a seat opening adapted for engagement with said main valve member and a sleeve portion formed with a sliding surface associated with said main valve member,
   said cylindrical member being further formed with a plurality of through holes on a downstream side of said seat portion said through holes forming a radially zig-zagged path for fluid flowing through said main valve member whereby abnormal sound is reduced or eliminated;
   said main valve unit including an inlet port communicated by an internal pilot passage with a control chamber of said pilot valve unit through a choke formed in a seat member of said pilot valve unit;
   said seat member being integrally formed with said choke in a single-body construction and including an expanded portion having an enclosed end and a plurality of through holes communicating said expanded portion with said internal pilot passage at said internal pilot passage side of said choke, said through holes being substantially perpendicular to said choke.

2. The relief valve according claim 1, wherein passages and said through holes of said cylindrical member engaging with said main valve member are arranged in such a manner that the pressure fluid flowing therethrough passes alternately along inner and outer peripheral sides of said cylindrical member.

3. The relief valve according to claim 2 wherein said cylindrical member engaging with said main valve member is supported sealingly with respect to said main valve member by an O-ring at each of at least two places respectively located near the axial ends of said cylindrical member.

4. The relief valve according to claim 1 wherein said passages and through holes engaging with said main valve member slow down the speed of the fluid by impacting said fluid against two surfaces for preventing the generation of abnormal sound.

5. A relief valve comprising:
   a main valve unit incorporating a main valve member adapted for engagement with a cylindrical member; and
   a pilot valve unit for controlling a pressure of a fluid;
   said cylindrical member is formed integrally with a seat portion formed with a seat opening adapted for engagement with said main valve member and a sleeve portion formed with a sliding surface associated with said main valve member,
   said cylindrical member being further formed with a plurality of through holes on a downstream side of said seat portion, said through holes of said cylindrical member engaging with said main valve member are arranged in such a manner that the pressure fluid flowing therethrough passes alternately along inner and outer peripheral sides of said cylindrical member;
   said main valve unit including an inlet port communicated by an internal pilot passage with a control chamber of said pilot valve unit through a choke formed in a seat member of said pilot valve unit;
   said seat member being integrally formed with said choke in a single-body construction and including an expanded portion having an enclosed end and a plurality of through holes communicating said expanded portion with said internal pilot passage at said internal pilot passage side of said choke, said through holes being substantially perpendicular to said choke.

6. A relief valve comprising:
   a main valve unit incorporating a main valve member adapted for engagement with a cylindrical member; and
   a pilot valve unit for controlling a pressure of a fluid,
   said cylindrical member being formed integrally with a seat portion formed with a seat opening adapted for engagement with said main valve member and a sleeve portion formed with a sliding surface associated with said main valve member, and
   said cylindrical member being further formed with a plurality of though holes on a downstream side of said seat portion, said through holes of said cylindrical member engaging with said main valve member are arranged in such a manner that the pressure fluid flowing therethrough passes alternately along inner and outer peripheral sides of said cylindrical member, one of said through holes having an elongated shape and having an inner impact surface for said pressure fluid for decreasing a fluid velocity thereof.

* * * * *